United States Patent [19]

Flockenhaus et al.

[11] Patent Number: 4,746,483

[45] Date of Patent: May 24, 1988

[54] PROCESS FOR THE MANUFACTURE OF CATALYST MOLDING

[75] Inventors: Claus Flockenhaus, Essen; Karl-Heinz Laue, Hattingen; Klaus Merkel; Erich Hackler, both of Essen; Johann Jansen, Duisburg; Arnold Max, Bottrop; Werner Stender, Raesfeld; Reinhard Kruse, Wesel; Hartmut Kainer, Wiesbaden; Daniel Grimm, Schlangenbad-Bärstadt; Blagoje Levkov, Wiesbaden, all of Fed. Rep. of Germany

[73] Assignees: Didier Engineering GmbH, Essen; Didier Werke AG, Wiesbaden, both of Fed. Rep. of Germany

[21] Appl. No.: 905,752

[22] Filed: Sep. 9, 1986

Related U.S. Application Data

[63] Continuation-in-part of Ser. No. 904,175, Sep. 5, 1986, and a continuation-in-part of Ser. No. 887,366, Jul. 17, 1986, and a continuation-in-part of Ser. No. 831,142, Feb. 19, 1986, Pat. No. 4,695,559.

[30] Foreign Application Priority Data

Sep. 10, 1985 [DE] Fed. Rep. of Germany ....... 3532207

[51] Int. Cl.⁴ .................... B01J 27/043; B01J 27/047; B29C 43/02; B29C 43/32
[52] U.S. Cl. ........................ 264/120; 264/63; 264/66; 264/109; 264/122; 264/319; 502/213; 502/217; 502/219; 502/222
[58] Field of Search ...... 264/63, 65, 66, 130, 264/133, 327; 502/64, 183, 209, 213, 222, 217, 219, 439; 423/213.5, 439

[56] References Cited

U.S. PATENT DOCUMENTS

| | | | |
|---|---|---|---|
| 948,947 | 2/1910 | Wrampelmeier | 502/338 |
| 3,214,388 | 10/1965 | Calvert | 502/213 X |
| 3,881,696 | 5/1975 | Lepeytre et al. | 423/213.2 |
| 3,928,238 | 12/1975 | Koberstein et al. | 502/241 |
| 3,943,217 | 3/1976 | Rother | 264/63 |
| 3,965,246 | 6/1976 | Hinrichs | 252/477 R |
| 4,043,939 | 8/1977 | Kasaoka | 252/416 |
| 4,044,102 | 8/1977 | Muraki et al. | 423/239 |
| 4,049,777 | 9/1977 | Divivier et al. | 423/239 |
| 4,070,440 | 1/1978 | Moriguchi et al. | 502/338 X |
| 4,092,092 | 5/1978 | Dye et al. | 264/150 |
| 4,093,561 | 6/1978 | Nishikawa et al. | 502/336 |
| 4,107,272 | 8/1978 | Mori et al. | 502/222 |
| 4,126,652 | 11/1978 | Oohara et al. | 264/63 |
| 4,138,368 | 2/1979 | Kiyomiya et al. | 502/316 X |
| 4,140,749 | 2/1979 | Baresel et al. | 423/213.5 |
| 4,183,885 | 1/1980 | Marazzi | 264/58 |
| 4,235,604 | 11/1980 | Wagener et al. | 252/373 |
| 4,259,312 | 3/1981 | Flockenhaus et al. | 423/659 |
| 4,285,838 | 8/1981 | Ishida et al. | 502/316 |
| 4,293,514 | 10/1981 | Wada | 264/63 |
| 4,448,895 | 5/1984 | Ono et al. | 502/304 |
| 4,495,118 | 1/1985 | Ikami | 264/25 |
| 4,503,162 | 3/1985 | Windawi et al. | 502/174 |
| 4,541,974 | 9/1985 | Yamaoka et al. | 264/63 |
| 4,695,559 | 9/1987 | Wagener et al. | 502/183 |

FOREIGN PATENT DOCUMENTS

| | | | |
|---|---|---|---|
| 2639848 | 12/1977 | Fed. Rep. of Germany . | |
| 52-72389 | 6/1977 | Japan | 502/316 |
| 1086221 | 10/1967 | United Kingdom | 502/316 |
| 2079172 | 1/1982 | United Kingdom | 502/527 |

*Primary Examiner*—Jan H. Silbaugh
*Assistant Examiner*—Karen D. Kutach
*Attorney, Agent, or Firm*—Nils H. Ljungman

[57] ABSTRACT

In a process for the manufacture of catalyst moldings a natural raw material containing $Fe_2O_3$, $Cr_2O_3$ or another such catalyst component such as $TiO_2$, $NbO_2$, $WO_3$, $V_2O_5$ or $MoO_3$ is screened to a grain size equal to or less than approximately 0.25 mm. This screened base mixture is thoroughly blended, and then preferably a concentrated sulphuric acid is added. This mixture of material is then pressed into a molding in a hydraulic press with a pressure of approximately 500 bar to produce the molding.

20 Claims, 3 Drawing Sheets

● $H_3PO_4$

○ $H_2SO_4$

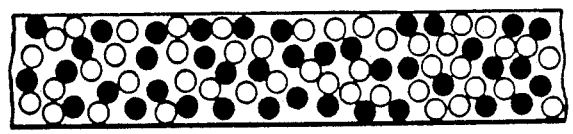
- ● $H_3PO_4$
- ○ $H_2SO_4$
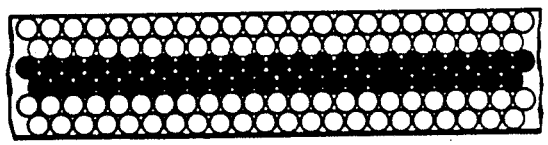
- ● $H_3PO_4$
- ○ $H_2SO_4$

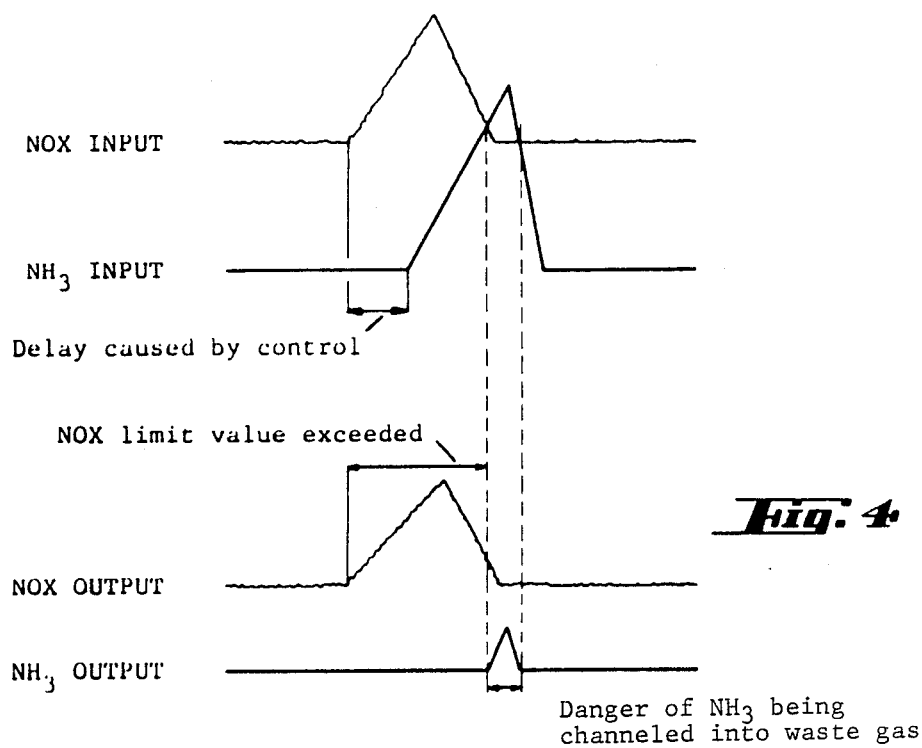
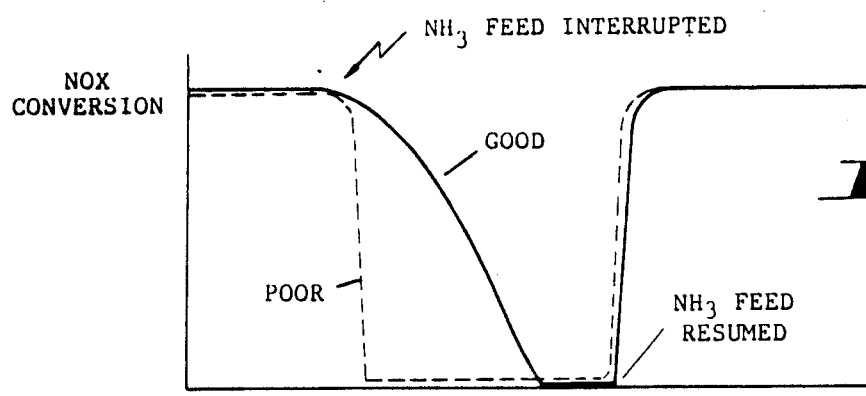

PROCESS FOR THE MANUFACTURE OF CATALYST MOLDING

CROSS-REFERENCE TO RELATED CO-PENDING APPLICATIONS

This application is a continuation-in-part of co-pending application Ser. No. 904175, filed on Sept. 5, 1986, entitled "Catalyst Plate", which corresponds to Federal Republic of Germany Patent Application No. P 35 31 651.9, filed on Sept. 5, 1985; a continuation-in-part of co-pending application Ser. No. 887366, filed on July 17, 1986, entitled "Process For The Production Of Catalysts For The Reduction Of Nitrogen Oxides From Exhaust Gases And Similar Chemical Air Cleaning Processes", which corresponds to Federal Republic of Germany Patent Application No. P 35 26 383.0, filed on July 24, 1985; and also a continuation-in-part of co-pending application Ser. No. 831,142, filed on Feb. 19, 1986, now U.S. Pat. No. 4,695,559 entitled "Catalyst for the Selective Reduction of Nitrogen Oxides in Waste Gases And Process For the Manufacture and Use of Such a Catalyst", which corresponds to Federal Republic of Germany Patent Application No. P 35 05 648.7, filed on Feb. 19, 1985, all of which are assigned to at least one of the same assignees as the instant application.

BACKGROUND OF THE INVENTION

1. Field of the Invention

The invention relates generally to a process for the manufacture of moldings, and more particularly to a process for the manufacture of catalyst moldings.

2. Description of the Prior Art

Such catalyst moldings are used for the reduction of nitrogen oxides in exhaust gases produced by combustion equipment. According to the prior art, the quantity of nitrogen oxides can be reduced by means of reducing agents such as CO, $NH_3$, $CH_4$, $H_2$, etc. The prior art also includes catalyst materials such as $TiO_2$, $WO_3$, $V_2O_5$, $MoO_3$, $Cr_2O_3$, $Fe_2O_3$ or mixtures of these materials, as well as catalytic additives such as $WO_3$, $V_2O_5$, $MoO_2$ and $Cr_2O_3$ as active substances. Additives in highly-pure form for use with carrier substances are expensive, and, because of their high activity, are sensitive to aging. They are also difficult to dispose of. The recovery of the valuable active substances is naturally desirable, but it entails a significant expense for equipment, which therefore has an adverse effect on the economy of the process.

Attempts have already been made to manufacture $Fe_2O_3$ catalyst material using sulphuric acid or phosphoric acid as binders. It has thereby been shown that only the sulphuric acid binding leads to a high activity, but it also produces an excessive sensitivity to water, which causes the moldings to absorb water and become soft. On the other hand, the phosphoric acid bonding reduces activity, but produces hard moldings which are not sensitive to water. Mixtures of phosphoric acid and sulphuric acid lead to a catalyst action which is not always satisfactory. Even the saturation of catalyst moldings containing a phosphoric acid binder with sulphuric acid, and vice-versa, results in only moderate improvements.

In the manufacture of catalyst moldings, it is frequently necessary to produce thin webs for plates, honeycombs, tubes and other configurations, which means that sufficient strength must be assured. This normally requires relatively high pressures with a homogeneous pressure distribution. Up to now, it has been impossible to achieve these caracteristics without a major expenditure for equipment. Therefore, molding manufacturing processes of the prior art suffer from the disadvantage that the molding must be removed from the mold very carefully and must be subjected to a long tempering process, to achieve a strong and durable shape. Attempts have also been made to use intermittent molding techniques or calendering. But here again, it turns out that the molding is either impossible to work with, or can only be worked with with great difficulty. Specifically, it is difficult to remove the molding from the mold, and undesirably long tempering times are necessary.

Catalysts are known, specifically, for example, catalysts containing $Fe_2O_3$, $Cr_2O_3$ or $V_2O_5$. In terms of their action, however, these catalyst leave something to be desired.

Some examples of catalytic technology are found in U.S. Pat. No. 4,259,312, entitled "Process And Apparatus For Catalytically Reacting A Reducing Gas And Water Vapor"; U.S. Pat. No. 4,235,604, entitled "Method For Processing Coke Oven Gas"; and U.S. Pat. No. 4,049,777, entitled "Method Of Waste Gas Treatment", all of which are assigned the same assignee as the instant application.

Further examples of catalytic technology are found in U.S. Pat. No. 4,448,895, entitled "Process For Preparation Of Catalyst For Cleaning Exhaust Gases And Catalyst Prepared For The Process", and U.S. Pat. No. 4,503,162, entitled "Catalyst Systems For The Conversion Of Gases".

Examples of reactivation of catalysts useful in nitrogen oxide removal are described in U.S. Pat. No. 4,044,102, entitled "Method For Treating Exhaust Gases", and U.S. Pat. No. 4,043,939, entitled "Reactivation Of Catalysts Useful For Nitrogen Oxide Removal." All of the above-cited patents are incorporated herein by reference as if the texts thereof were fully set forth herein.

OBJECT OF THE INVENTION

The object of the present invention, therefore, is to provide a simple and economical process by which inexpensive and disposable substances which are resistant to aging can be processed into sufficiently active and solid catalyst moldings.

SUMMARY OF THE INVENTION

One aspect of the invention resides broadly in a process for manufacturing molded bodies from at least one catalytic material. The process comprising the steps of selecting at least a portion of the catalytic material having a grain size of less than approximately 0.25 mm, optionally treating the selected portion of the at least one catalyst, adding sulphuric acid to the catalytic material, and molding the material formed after the sulphuric acid is added to the catalytic material at a predetermined pressure to produce the molded bodies.

BRIEF DESCRIPTION OF THE DRAWINGS

Advantageous embodiments of the present invention are illustrated in the accompanying drawings.

FIG. 1 shows one embodiment of a catalyst molding, which molding was molded from layers of existing moldings, whereby the black spots are intended to represent the catalyst material with phosphoric acid as binder, and the white spots represent sulphuric acid as binder.

FIG. 2 shows another embodiment of a catalyst molding, whereby the inside layer consists of catalyst material with phosphoric acid as binder, and the two outside layers of catalyst material with sulphuric acid as binder.

FIG. 4 shows how the channeling of ammonia into the waste gas can be prevented with the catalyst.

FIG. 5 shows the control action of a catalyst because of the high sorption capability for ammonia.

DESCRIPTION OF THE PREFERRED EMBODIMENTS

Figure 3:
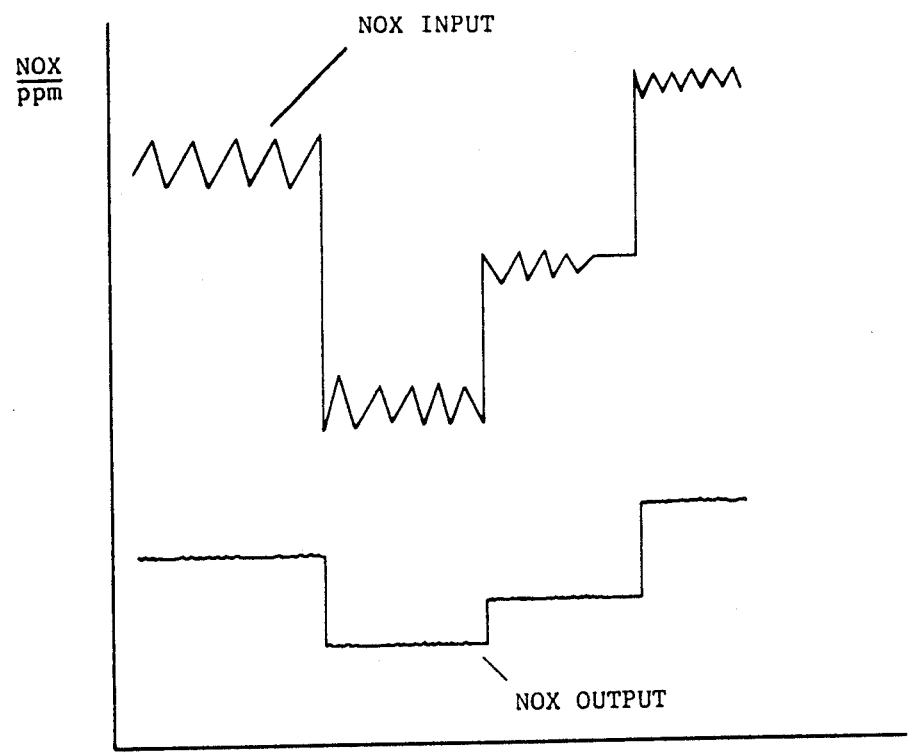
FIG. 3 shows how the catalyst largely compensates for fluctuations in the nitrogen oxide input concentration.

The moldings of the present invention may be made from natural raw material (such as ore without preliminary grinding) containing $Fe_2O_3$, $Cr_2O_3$, or another such catalyst component, such as $TiO_2$ or $NbO_2$, $WO_3$, $V_2O_5$, or $MoO_3$, which is screened to a grain size below approximately 0.25 mm. The screened basic mixture is thoroughly blended, and then preferably a concentrated sulphuric acid is added. This material mixture is then pressed into a molding in a hydraulic press with a pressure of approximately 500 bar. It has been shown that, as a result of the addition of the concentrated sulphuric acid, the materials $Al_2O_3$, MgO, CaO and other similar materials which occur in the natural ore rapidly set and form a sulfated support element for the molding, which thereby receives sufficient stability for handling, even if the molding comprises relatively complicated and thin structures. The formation of $MgSO_4$, $CaSO_4$, etc., according to a process described in an embodiment of the invention, also prevents a reduction in the size of the micropores formed during manufacturing when the catalyst is exposed to exhaust gases containing sulphur trioxide. Unsuccessful attempts have been made in the past to control the size of these micropores, using $Fe_2O_3$ on aluminum oxide carriers.

It has been shown that approximately 20 to 60 ml, preferably 40 ml, of sulphuric acid can advantageously be added to 1000 g of screened basic mixture. This relatively small quantity of concentrated sulphuric acid can be used to make certain that the hygroscopic properties of the catalyst molding produced remain within acceptable limits.

In the process, additional strength can also be achieved through the use of phosphate binder by using a concentrated sulphuric acid which contains up to 10%, that is, only a relatively small proportion, of phosphoric acid. Such a measure is taken, however, at the expense of a certain deactivation of the catalyst components by blocking the voids, for example, in $FE_2O_3$/- $Fe_3O_4$ mixtures.

The manufacturing process proposed in an embodiment of the invention is preferably executed so that the basic mixture is applied to a plate-shaped support body, an external mold is placed on top of it and filled with basic material which is slightly compressed and scraped, another plate-shaped cover is placed on the mold, and this unit is subjected to the mold pressure. The mold can also exhibit spacers.

The support body and the cover are advantageously sprayed, before the basic material is placed inside, with a molding parting compound, preferably a material containing silicon.

The entire unit comprising the support body, the external mold and the cover can therefore be removed all at once from the press, and subjected as a unit to the drying and calcining process. The catalyst molding is thus not exposed to any stresses, as was the case with manufacturing processes of the prior art.

The drying is preferably done at approximately 150° C. for a period of 5 to 500 minutes, and calcining is done at approximately 450° C., also for a period of approximately 5 to 500 minutes.

It also turns out to be particularly advantageous to leave the molding in the calcining furnace for approximately 1 to 24 hours after the calcining process, and removing it from the calcining furnace only after it was cooled to a temperature of between approximately 20° to 200° C. Then the finished, for example, plate-shaped, catalyst molding can be inserted into cartridges, and used in an electric power generation plant.

The catalyst moldings manufactured exhibit good control characteristics, high yields and a wide temperature range with high activity.

Methods of forming the moldings of the present invention are well known in the prior art. Some recently published examples are found in U.S. Pat. No. 4,495,118, entitled "Ceramic Plates and Method For The Production Thereof"; U.S. Pat. No. 4,183,885, entitled "Quick Baking Process for Ceramic Products"; U.S. Pat. No. 4,092,092, entitled "Apparatus for Making Ceramic Articles"; U.S. Pat. No. 3,965,246, entitled "Process for the Production of Ammonia Using Aligned Catalyst Particles"; and U.S. Pat. No. 3,881,696, entitled "Catalyst for Cleaning Engine Exhaust Gases". All of the above-cited patents are incorporated by reference as if the entire contents thereof were fully set forth herein.

FIG. 1 shows one embodiment of a catalyst molding which was molded from layers of existing moldings, whereby the black spots are intended to represent the catalyst material with phosphoric acid as binder, and the white spots represent sulphuric acid as binder.

FIG. 2 shows another embodiment of a catalyst molding, whereby the inside layer consists of catalyst material with phosphoric acid as binder, and the two outside layers of catalyst material with sulphuric acid as binder.

The catalyst, whose properties are shown in FIGS. 3 through 5, retains an extraordinarily good control action, in addition to its known high activity and selectivity. Its possible applications, moreover, are very economical. The good control action is specifically determined by the relatively high sorption capability for ammonia, so that even with significant nitrogen oxide fluctuations in the waste gas to be purified, the danger of ammonia being channeled into the gas can be prevented, which would otherwise lead to problems in the downstream equipment. Because of the low oxidation capability of the catalyst described by the invention, there is no further oxidation of the sulfur dioxide, ammonia, or similar substances found in the gas to be purified. The sulfur trioxide, which occurs when sulfur dioxide is further oxidized, would otherwise be converted to sulfates with the ammonia in the waste gas stream. The oxidation of the ammonia added for the reduction to water and nitrogen, which does not take place because of the low oxidation capability of the catalyst, reduces the consumption of operating materials, so that a more economical operation of a purification process can be achieved.

For most applications of the catalyst, it is particularly advantageous if the sorption capability for ammonia is high enough so that in a temperature range of between approximately 280° C. and 450° C., and in spite of nitrogen oxide fluctuations of up to 200 milligrams per cubic meter and essentially constant ammonia feed, no ammonia is channeled into the waste gas.

In another configuration, it is advantageous if the activity and selectivity regarding the nitrogen oxide conversion are essentially constant in the temperature range between 280° C. and 450° C. and the oxidation capability is negligible.

According to another feature, the catalyst is characterized by macropores between approximately 0.5 and 50 microns.

The characteristics of the invention described above can be achieved, for example, by a mixture of substances, which exhibit the basic substances A and B, whereby the basic substance A comprises the following components:

89 to 92 percent by weight of $Fe_2O_3$;
3 to 4 percent by weight of $Fe_3O_4$;
4 to 5 percent by weight of $SiO_2$;
1 to 2 percent by weight of $Al_2O_3$;
0.01 to 0.2 percent by weight of $MnO$;
0.01 to 0.03 percent by weight of $CaO$;
0.01 to 0.02 percent by weight of $MgO$; and
0.7 to 0.001 percent by weight of $V_2O_5$, and the basic substance B comprises the following components:

30 to 48 percent by weight of $Cr_2O_3$;
12 to 30 percent by weight of $Fe_2O_3$;
10 to 30 percent by weight of $Al_2O_3$;
10 to 25 percent by weight of $MgO$; and
1 to 5 percent by weight of $SiO_2$.

Surprisingly, such mixtures of substances have high activity and selectivity for nitrogen oxide conversion, high sorption capability for ammonia and low oxidation capacity for sulfur dioxide and ammonia, especially in the temperature range of between approximately 350° C. and 450° C. This is all the more surprising, since the known catalysts which contain $Fe_2O_3/Cr_2O_3$, of course, have relatively high activity and selectivity, as do combinations of $V_2O_5$ and $TiO_2$ in mixtures with $WO_3$. But there sorption capability with regard to ammonia is low, so that there is a poor control characteristic in the presence of severe and spontaneous nitrogen oxide fluctuations. The characteristics of the mixture of basic substances A and B are, therefore, surprising, because mixtures of $V_2O_5$ and $TiO_2$ already exhibit a significant oxidation-promotion effect in a temperature range from 350° C. to 450° C., which could only be limited by the addition of inhibitors, or else such a catalyst could not be used for gases containing sulfur. In the temperature range from 280° C. to 350° C., $V_2O_5/TiO_2$ catalysts exhibit relatively high activity and selectivity with regard to the nitrogen oxide conversion, as well as a low tendency to oxidation. They also exhibit a low sorption capability with regard to ammonia, so that their control characteristic is poor. $Fe_2O_3/Cr_2O_3$ mixtures exhibit a high sorption capability at temperatures from 280° C. to 350° C., which results in a good control behavior, but their activity is low.

Furthermore, it has been shown that, surprisingly, the activity of the mixture of substances can be significantly increased by sulfatization.

The same is true for a temperature range from 280° C. to 350° C., if the $V_2O_5$ is finely divided in the mixture.

According to one feature of the process, sufficient strength and water-resistance can be imparted to the dry mixture of substances of the catalyst if it is present in a grain size of less than 0.2 mm and bonded with a phosphate acid such as phosphoric acid.

The activation of the catalyst is carried out according to another characteristic feature, preferably by means of sulphuric acid or $VOSO_4$ by saturation.

A heat treatment, that is, calcination, of the mixture of substances is preferably done at 200° C. to 500° C., whereby temperature increase rates of preferably between about 500° C. per minute and about 1° C. per minute are used.

It is also proposed that fiber material of glass and/or ceramic and/or carbon and/or steel be added to the mixture of substances, which fiber material is used as a support structure during the molding of the mixture of substances into moldings.

The molding of the mixture of substances is preferably done isostatically into smooth or corrugated plates.

It has thereby been shown to be particularly advantageous if a molding pressure of between about 0.1 and about 100 metric tons per square centimeter.

The substances are molded, preferably into plates with a thickness of approximately 0.5 to 5 mm, and preferably approximately 1 to 3 mm.

According to another embodiment of the invention, the size of the plates is set during molding to between approximately 1 and 10,000 square centimeters.

An advantageous application of the catalyst comprises its use in the form of plates or corrugated plates at specified intervals in integrated units or cassettes, for the creation of a free-passage catalyst unit. The cassettes can exhibit corrugated spacer plates to separate the catalyst, present in the form of plates. This configuration results in infinitely long slits. The cassettes are appropriately combined to form complete reactors.

In the preparation of the catalyst using sulphuric acid as the bonding agent, the above-described process of FIGS. 3 to 5 may be used with the exception that sulphuric acid is used therein in place of the phosphoric acid or other phosphate acid.

In order to achieve the configuration of FIG. 1, the catatyic materials with their different binders can be mixed and then pressed or otherwise formed into a catalyst molding. In the configuration of FIG. 2, separate parts can be made, each from the catalyst with different binders, and then these parts can be joined together by, for example, pressing or otherwise, to form the catalytic molding therein.

The invention as described hereinabove in the context of the preferred embodiments is not to be taken as limited to all of the provided details thereof, since modifications and variations thereof may be made without departing from the spirit and scope of the invention.

What is claimed is:

1. A process for the manufacture of molded catalytic bodies, said process comprising the steps of:
   (a) selecting a natural raw material in a naturally occurring form, said natural raw material containing at least one catalytic material selected from the group consisting of $Fe_2O_3$, $Cr_2O_3$, $TiO_2$, $NbO_2$, $WO_3$, $V_2O_5$ and $MoO_3$;

(b) screening said natural raw material to a maximum grain size of about 0.25 mm;

(c) mixing said screened natural raw material obtained from step (b) with concentrated sulphuric acid in the proportions of about 20 to about 60 ml of concentrated sulphuric acid per 1000 g of screened natural raw material;

(d) placing an external mold on a support member;

(e) filling said external mold with the mixture obtained from step (c);

(f) placing a cover member on said mold;

(g) subjecting the assembly obtained from step (f) to a pressure of approximately 500 bar to manufacture said molded catalytic body;

(h) thereafter, subjecting said assembly comprising said molded catalytic body to a drying process at a temperature of approximately 150° C.; and (i) thereafter, subjecting said assembly comprising said molded catalytic body to a calcining process at a temperature of approximately 450° C.

2. The process according to claim 1, wherein said natural raw material contains at least one catalytic material selected from the group consisting of $Fe_2O_3$ and $Cr_2O_3$.

3. The process according to claim 1, wherein said concentrated sulphuric acid employed in step (c) contains up to about 10% phosphoric acid.

4. The process according to claim 2, wherein said concentrated sulphuric acid employed in step (c) contains up to about 10% phosphoric acid.

5. The process according to claim 1, wherein, following said filling step (e), said mixture in said mold is slightly compressed and scraped.

6. The process according to claim 2, wherein, following said filling step (e), said mixture in said mold is slightly compressed and scraped.

7. The process according to claim 1, wherein said support member and said cover member are sprayed with a parting compound.

8. The process according to claim 2, wherein said support member and said cover member are sprayed with a parting compound.

9. The process according to claim 3, wherein said support member and said cover member are sprayed with a parting compound.

10. The process according to claim 4, wherein said support member and said cover member are sprayed with a parting compound.

11. The process according to claim 7, wherein said parting compound comprises silicon.

12. The process according to claim 8, wherein said parting compound comprises silicon.

13. The process according to claim 1, wherein said drying step (h) is carried out for a period of about 5 to about 500 minutes.

14. The process according to claim 2, wherein said drying step (h) is carried out for a period of about 5 to about 500 minutes.

15. The process according to claim 3, wherein said drying step (h) is carried out for a period of about 5 to about 500 minutes.

16. The process according to claim 1, wherein said calcining step (i) is carried out for a period of about 5 to about 500 minutes.

17. The process according to claim 13, wherein said calcining step (i) is carried out for a period of about 5 to about 500 minutes.

18. The process according to claim 1, wherein said calcining step (i) is carried out in a furnace, wherein said assembly remains in said furnace after said calcining step (i) for a period of about 1 to about 24 hours and wherein said assembly is removed from said furnace only after said assembly has cooled to a temperature of between about 20° C. and about 200° C.

19. The process according to claim 16, wherein said calcining step (i) is carried out in a furnace, wherein said assembly remains in said furnace after said calcining step (i) for a period of about 1 to about 24 hours and wherein said assembly is removed from said furnace only after said assembly has cooled to a temperature of between about 20° C. and about 200° C.

20. A process for the manufacture of molded catalytic bodies, said process comprising the steps of:

(a) selecting a natural raw material in a naturally occurring form, said natural raw material containing at least one catalytic material selected from the group consisting of $Fe_2O_3$, $Cr_2O_3$, $TiO_2$, $NbO_2$, $WO_3$, $V_2O_5$ and $MoO_3$;

(b) screening said natural raw material to a maximum grain size of about 0.25 mm;

(c) mixing said screened natural raw material obtained from step (b) with concentrated sulphuric acid in the proportions of about 20 to about 60 ml of concentrated sulphuric acid per 1000 g of screened natural raw material;

(d) placing an external mold on a support member;

(e) spraying a parting compound on said support member, said parting compound comprising silicon;

(f) filling said external mold with the mixture obtained from step (c);

(g) slightly compressing and scraping said mixture in said mold;

(h) spraying a cover member with said parting compound;

(i) placing said cover member on said mold;

(j) subjecting the assembly obtained from step (i) to a pressure of approximately 500 bar to manufacture said molded catalytic body;

(k) thereafter, subjecting said assembly comprising said molded catalytic body to a drying process at a temperature of approximately 150° C., said drying process being carried out for a period of about 5 to about 500 minutes;

(l) thereafer, subjecting said assembly comprising said molded catalytic body to a calcining process at a temperature of approximately 450° C., said calcining process being carried out in a furnace for a period of about 5 to about 500 minutes; and (m) leaving said assembly comprising said molded catalytic body in said furnace after said calcining step (l) for a period of about 1 to about 24 hours and removing said assembly from said furnace only after said assembly has cooled to a temperature of between about 20° C. and about 200° C.

* * * * *